United States Patent
Chen et al.

(10) Patent No.: US 9,710,089 B2
(45) Date of Patent: Jul. 18, 2017

(54) TOUCH DISPLAY PANEL HAVING A PLURALITY OF SPACERS CONNECTED TO A THIN FILM TRANSISTOR AND MANUFACTURING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Xi Chen, Beijing (CN); Jinchao Bai, Beijing (CN); Zheng Liu, Beijing (CN); Xiaoxiang Zhang, Beijing (CN); Mingxuan Liu, Beijing (CN); Zhichao Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/894,936

(22) PCT Filed: Jul. 16, 2015

(86) PCT No.: PCT/CN2015/084209
§ 371 (c)(1),
(2) Date: Nov. 30, 2015

(87) PCT Pub. No.: WO2016/107139
PCT Pub. Date: Jul. 7, 2016

(65) Prior Publication Data
US 2016/0342251 A1 Nov. 24, 2016

(30) Foreign Application Priority Data
Jan. 4, 2015 (CN) .......................... 2015 1 0002288

(51) Int. Cl.
*G06F 3/041* (2006.01)
*G09G 3/20* (2006.01)

(52) U.S. Cl.
CPC ............ *G06F 3/0412* (2013.01); *G06F 3/041* (2013.01); *G06F 3/0416* (2013.01); *G09G 3/2092* (2013.01); *G06F 2203/04103* (2013.01)

(58) Field of Classification Search
CPC .................................................... G06F 3/0412
(Continued)

(56) References Cited

U.S. PATENT DOCUMENTS

2009/0268131 A1* 10/2009 Tsai .................... G02F 1/13338
349/106
2009/0278810 A1* 11/2009 Ma ........................ G06F 3/0412
345/173
(Continued)

FOREIGN PATENT DOCUMENTS

CN 101498851 8/2009
CN 101901077 12/2010
(Continued)

OTHER PUBLICATIONS

Written Opinion of the International Searching Authority from corresponding PCT Application PCT/CN2015/084209 (4 pages); Sep. 25, 2015.

*Primary Examiner* — Long D Pham
(74) *Attorney, Agent, or Firm* — Harness, Dickey & Pierce, P.L.C.

(57) ABSTRACT

A touch display panel, a manufacturing method thereof, a driving method and a touch display device are disclosed. The touch display panel comprises an array substrate and a color film substrate, wherein the array substrate comprises a first thin film transistor and a first detection line formed on a first substrate, and the color film substrate comprises a main spacer, an auxiliary spacer, a reference signal line and
(Continued)

a second detection line formed on a second substrate. The bottom of the main spacer is connected to the reference signal line, the top of the main spacer is connected to a first source, the bottom of the auxiliary spacer is connected to the second detection line, and a projection of the top of the auxiliary spacer on the array substrate connects a first drain with the first detection line.

15 Claims, 8 Drawing Sheets

(58) Field of Classification Search
USPC .......................................................... 345/173
See application file for complete search history.

(56) References Cited

U.S. PATENT DOCUMENTS

| 2010/0033668 | A1* | 2/2010 | Koito | ................. | G02F 1/13338 |
| | | | | | 349/155 |
| 2011/0063238 | A1 | 3/2011 | Liu et al. | | |
| 2012/0133612 | A1* | 5/2012 | Wang | ................... | G06F 3/0412 |
| | | | | | 345/174 |

FOREIGN PATENT DOCUMENTS

| CN | 102109691 | 6/2011 |
| CN | 203799352 | 8/2014 |
| CN | 104503622 | 4/2015 |

\* cited by examiner

TOUCH DISPLAY PANEL HAVING A PLURALITY OF SPACERS CONNECTED TO A THIN FILM TRANSISTOR AND MANUFACTURING METHOD THEREOF

TECHNICAL FIELD

The present invention relates to the field of display technology, and more particularly, to a touch display panel, a manufacturing method thereof, and a driving method thereof, and a touch display device.

BACKGROUND

Touch display panel is one of important carriers for integrating input and output. In recent years, with the advent of a series of products such as small and light handheld devices, a demand for touch display devices is increasing. In-cell touch display panel integrates touch structure with display structure together, and it becomes the new developing trend in the future thanks to the advantages of integration, lightness, low cost, low power consumption, high image quality, and implementation of multi-touch, etc.

FIG. 1 is a structural diagram of a touch display panel in the prior art. As shown in FIG. 1, the touch display panel comprises an array substrate and a color film substrate. The array substrate comprises a gate line 1 and a data line 2 which define a pixel unit. A thin film transistor 5, a pixel electrode 6, a first contact 7, a second contact 8, a touch scan line 3 and a touch sense line 4 are formed in the pixel unit. The first contact 7 is connected to the touch scan line 3, and the second contact 8 is connected to the touch sense line 4. The color film substrate comprises an electric conductor (not shown) which corresponds to both of the first and second contacts 7, 8. When the touch display panel is touched, the electric conductor at the touch point electrically connects the first contact 7 and the second contact 8. The touch scan signal in the touch scan line is transmitted to the touch sense line through the electric conductor, and the position of the touch point may be detected by detecting the signal in the touch sense line.

However, as the first contact 7, second contact 8, touch scan line 3 and touch sense line 4 for implementing the touch control function are all arranged on the array substrate and within the pixel unit, the manufacturing process of the array substrate in the prior art is complicated and the aperture ratio of the pixel unit is low.

SUMMARY

Embodiments of the present invention provide a touch display panel, a manufacturing method thereof, a driving method thereof and a touch display device, which can effectively simplify the structure and manufacturing process of the array substrate and improve the aperture ratio of the pixel unit.

According to an embodiment of the present invention, there is provided a touch display panel which comprises an array substrate and a color film substrate which is disposed in opposition to the array substrate.

The array substrate comprises a first thin film transistor and a first detection line formed on a first substrate. The first thin film transistor comprises a first gate, a first active layer, a first source and a first drain. The color film substrate comprises a main spacer, an auxiliary spacer, a reference signal line and a second detection line formed on a second substrate. Both of the main spacer and the auxiliary spacer are conductors. The bottom of the main spacer is connected to the reference signal line, and the top of the main spacer is connected to the first source. The bottom of the auxiliary spacer is connected to the second detection line, and a projection of the top of the auxiliary spacer on the array substrate connects the first drain with the first detection line.

In an embodiment of the present invention, the array substrate may further comprise a gate line and a data line formed on the first substrate. The gate line and the data line define a pixel unit in which a pixel electrode and a second thin film transistor are formed. The second thin film transistor is connected to the gate line, the data line and the pixel electrode.

In an embodiment of the present invention, the second thin film transistor may comprise a second gate, a second active layer, a second source and a second drain. The second gate and the gate line are disposed at the same layer. The second gate is formed on the first substrate, and a gate insulation layer is formed on the second gate. The second active layer is formed on the gate insulation layer. The second source and the second drain are formed at the same layer as the data line and are formed on the second active layer. A passivation layer is formed on the second source and the second drain. A via hole is formed in a region corresponding to the second drain in the passivation layer, and the pixel electrode is connected to the second drain through the via hole. The first gate is the gate line. The first active layer and the second active layer are disposed at the same layer. An opening is formed in a region corresponding to the first active layer in the passivation layer. The first source and the first drain are disposed at the same layer as the pixel electrode and are connected to the first active layer in the opening. The first detection line and the pixel electrode are disposed at the same layer.

In an embodiment of the present invention, a projection of the gate line on the color film substrate may cover the reference signal line and the second detection line.

In an embodiment of the present invention, the reference signal line and the second detection line may be disposed at the same layer, and the reference signal line and the second detection line may be both parallel to the gate line.

In an embodiment of the present invention, the first detection line may be right above the data line.

In an embodiment of the present invention, the color film substrate may further comprise a color film layer and a black matrix formed on the second substrate. Moreover a common electrode is formed on the black matrix. The reference signal line and the second detection line are disposed at the same layer as the common electrode.

In an embodiment of the present invention, the main spacer may comprise a main spacer body and a main spacer conductive layer disposed on outside surface of the main spacer body. The auxiliary spacer may comprise an auxiliary spacer body and an auxiliary spacer conductive layer disposed on outside surface of the auxiliary spacer body. The main spacer conductive layer and the reference signal line are integrally formed, and the auxiliary spacer conductive layer and the second detection line are integrally formed.

In an embodiment of the present invention, the height of the main spacer is greater than that of the auxiliary spacer.

According to another embodiment of the present invention, there is provided a touch display device which comprises a touch display panel as described above.

According to another embodiment of the present invention, there is provided a method for manufacturing a touch display panel, wherein the touch display panel comprises an array substrate and a color film substrate disposed in opposition to the array substrate. The method comprises manufacturing the array substrate which comprises a first thin film transistor and a first detection line formed on a first substrate, wherein the first thin film transistor comprises a first gate, a first active layer, a first source and a first drain; manufacturing the color film substrate which comprises a main spacer, an auxiliary spacer, a reference signal line and a second detection line formed on a second substrate, wherein both of the main spacer and the auxiliary spacer are conductors, wherein the bottom of the main spacer is connected to the reference signal line, the top of the main spacer is connected to the first source, and the bottom of the auxiliary spacer is connected to the second detection line; and aligning the array substrate with the color film substrate, such that the top of the main spacer is connected to the first source, and a projection of the top of the auxiliary spacer on the array substrate connects the first drain with the first detection line.

In an embodiment of the present invention, the array substrate may further comprise a gate line and a data line formed on the first substrate, wherein the gate line and the data line define a pixel unit in which a pixel electrode and a second thin film transistor are formed, and the second thin film transistor comprises a second gate, a second active layer, a second source and a second drain.

The step of manufacturing the array substrate may include forming the gate line and the second gate on the first substrate by means of a pattering process, the gate line being reused as the first gate of the first thin film transistor; forming a gate insulation layer on the gate line and the second gate; forming the first active layer and the second active layer on the gate insulation layer by means of a pattering process; forming the data line, the second source and the second drain on the first active layer and the second active layer by means of a pattering process; forming a passivation layer on the data line, the second source and the second drain by means of a pattering process, such that a via hole is formed in a region corresponding to the second drain in the passivation layer, and an opening is formed in a region corresponding to the first active layer in the passivation layer; and forming the pixel electrode, the first source, the first drain and the first detection line on the passivation layer by means of a pattering process, wherein the pixel electrode is connected to the second drain through the via hole, and the first source and the first drain are connected to the second active layer in the opening.

In an embodiment of the present invention, the color film substrate may further comprise a color film layer and a black matrix formed on the second substrate, wherein a common electrode is formed on the black matrix. The main spacer comprises a main spacer body and a main spacer conductive layer disposed on outside surface of the main spacer body and the auxiliary spacer comprises an auxiliary spacer body and an auxiliary spacer conductive layer disposed on outside surface of the auxiliary spacer body. The step of manufacturing the color film substrate includes: forming the color film layer and the black matrix on the second substrate; forming the main spacer body and the auxiliary spacer body on the black matrix by means of a halftone masking process, wherein the height of the main spacer body is greater than that of the auxiliary spacer body; and forming the reference signal line, the second detection line and the common electrode on the black matrix by means of a pattering process, wherein the main spacer conductive layer is formed on the outside surface of the main spacer body, and the auxiliary spacer conductive layer is formed on the outside surface of the auxiliary spacer body.

According to another embodiment of the present invention, there is provided a method for driving a touch display panel, wherein the touch display panel comprises an array substrate and a color film substrate, the array substrate comprises a first thin film transistor and a first detection line formed on a first substrate, the first thin film transistor comprises a first gate, a first active layer, a first source and a first drain, the color film substrate comprises a main spacer, an auxiliary spacer, a reference signal line and a second detection line formed on a second substrate, both of the main spacer and the auxiliary spacer are conductors, wherein the bottom of the main spacer is connected to the reference signal line, the reference signal line is loaded with a current signal, the top of the main spacer is connected to the first source, the bottom of the auxiliary spacer is connected to the second detection line, and a projection of the top of the auxiliary spacer on the array substrate is connected to the first drain and the first detection line. The driving method comprises: loading a start signal into the first gate, such that the first thin film transistor is turned on, in response to a touch on the touch display panel, causing the auxiliary spacer at a point of the touch to move downwards to be connected to both of the first drain and the first detection line, such that the current signal in the reference signal line is transmitted to the first detection line and the second detection line through the first thin film transistor and the auxiliary spacer, and detecting, by a detection unit, the current signal in the first detection line and the second detection line to determine a position of the point to implement touch control function.

In an embodiment of the present invention, the array substrate may further comprises a gate line and a data line formed on the first substrate, wherein the gate line and the data line defines a pixel unit in which a pixel electrode and a second thin film transistor are formed. The second thin film transistor may comprises a second gate, a second active layer, a second source and a second drain, wherein the first gate is the gate line, and the start signal is the scan signal loaded in the gate line. The method may further comprises, at the same time of performing the step of implementing the touch control function, loading the scan signal into the gate line, such that the second thin film transistor is turned on, and a display signal in the date line is transmitted to the corresponding pixel electrode through the second thin film transistor.

With the touch display panel, manufacturing method thereof, driving method thereof and touch display device of the embodiments of the present invention the respective metal wirings for implementing the touch control function can be arranged on different display panels (e.g. the array substrate and/or color film substrate), therefore the number of the wirings on the array substrate can be effectively reduced, and the complexity of the manufacturing process of the array substrate can be further decreased and the aperture ratio of the pixel unit can be increased.

DETAILED DESCRIPTION

To facilitate those skilled in the art to well understand the technical solution of the present invention, the touch display panel, manufacturing method thereof, driving method thereof and touch display device according to the embodiments of the present invention will be described in detail in conjunction with the drawings.

First Embodiment

Figure 1:
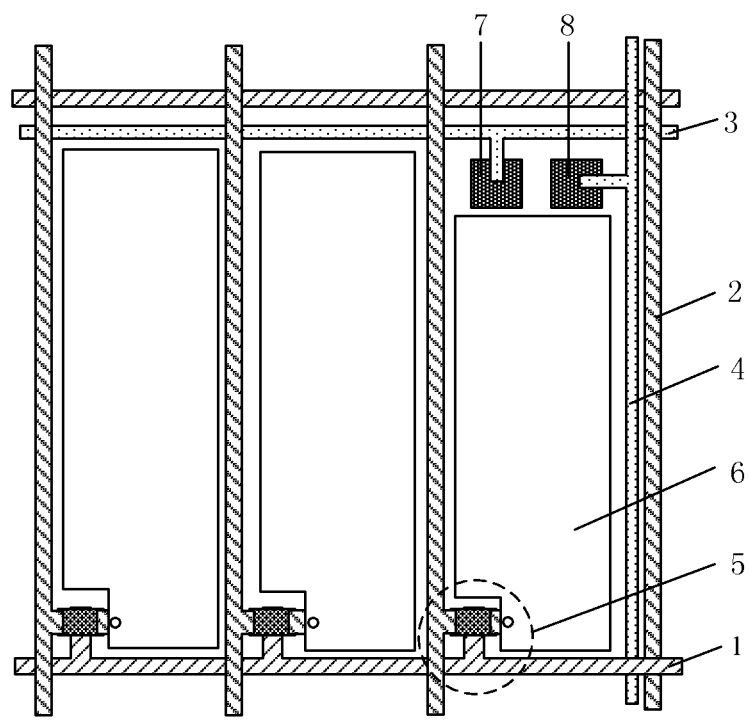
FIG. 1 is a structural diagram of a touch display panel in the prior art.
Figure 2:
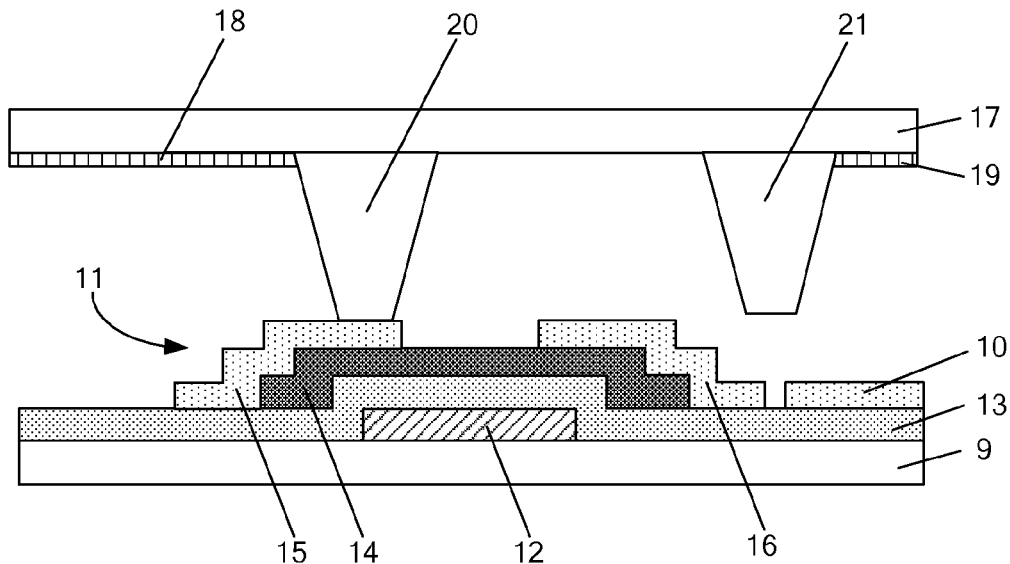
FIG. 2 is a section view of the touch display panel according to a first embodiment of the present invention.

FIG. 2 is a section view of the touch display panel according to the first embodiment of the present invention. As shown in FIG. 2, the touch display panel may comprise an array substrate and a color film substrate disposed in opposition to the array substrate. The array substrate may comprise a first thin film transistor 11 and a first detection line 10 formed on a first substrate 9. The first thin film transistor 11 may comprises a first gate 12, a first active layer 14, a first source 15 and a first drain 16. A gate insulation layer 13 may be formed between the first gate 12 and the first active layer 14. The color film substrate may comprise a main spacer 20, an auxiliary spacer 21, a reference signal line 18 and a second detection line 19 formed on a second substrate 17. Both of the main spacer 20 and the auxiliary spacer 21 are conductors. The bottom of the main spacer 20 is connected to the reference signal line 18 in which a current signal is loaded. The top of the main spacer 20 is connected to the first source 15. The bottom of the auxiliary spacer 21 is connected to the second detection line 19, and a projection of the top of the auxiliary spacer 21 on the array substrate connects the first drain 16 with the first detection line 10.

The method for driving the touch display panel as shown in FIG. 2 is also provided. In the method, a start signal is loaded into the first gate 12, and thus the first thin film transistor 11 is turned on. Then the reference signal line 18 is loaded with the current signal. When there is a touch on the touch display panel, the auxiliary spacer 21 at the touch point will move downwards to be connected to both of the first drain 16 and the first detection line 10. Then the current signal in the reference signal line 18 may be transmitted to the first detection line 10 and the second detection line 19 through the first thin film transistor 11 and the auxiliary spacer 21. Thus, a detection unit (not shown) can detect the current signal in the first detection line 10 and the second detection line 19 to determine the position of the touch point, so as to implement the touch control function.

In the embodiment of the present invention, the respective metal wirings for implementing the touch control function can be arranged on different display panels (e.g. the array substrate and/or color film substrate), therefore the number of the wirings on the array substrate can be effectively reduced, and the complexity of the manufacturing process of the array substrate can be further decreased. In addition, as the number of the wirings on the array substrate is reduced, the aperture ratio of the pixel unit can be effectively increased.

Figure 3:
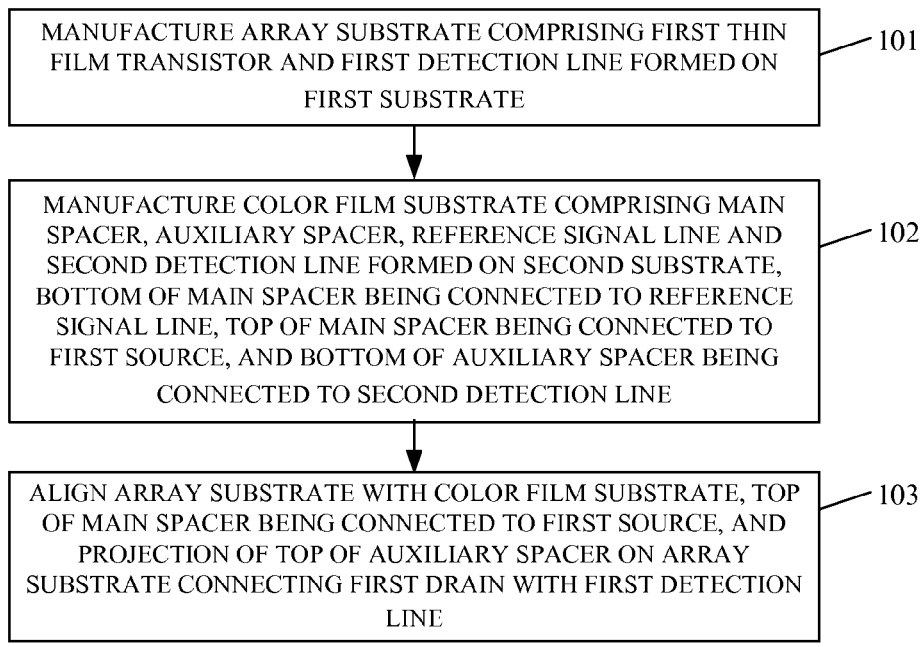
FIG. 3 is a flow chart of the method for manufacturing the touch display panel as shown in FIG. 2.

A method for manufacturing the touch display panel as shown in FIG. 2 is also provided. FIG. 3 is a flow chart of the method for manufacturing the touch display panel as shown in FIG. 2. As shown in FIG. 3, the method may comprise steps 101 to 103.

In step 101, the array substrate is manufactured. The array substrate may comprise the first thin film transistor and the first detection line formed on the first substrate. The first thin film transistor 11 comprise the first gate 12, the first active layer 14, the first source 15 and the first drain 16. The gate insulation layer 13 is formed between the first gate 12 and the first active layer 14. The process of forming the thin film transistor is well known in the art, and its detailed description will be omitted.

In step 102, the color film substrate is manufactured. The color film substrate comprises the main spacer, the auxiliary spacer, the reference signal line and the second detection line formed on the second substrate. The bottom of the main spacer is connected to the reference signal line, and the top of the main spacer is connected to the first source. The bottom of the auxiliary spacer is connected to the second detection line. Both of the main spacer 20 and the auxiliary spacer 21 of the color film substrate are conductors. That is, both of the main spacer 20 and the auxiliary spacer 21 are electrically conductive.

In step 103, the array substrate is aligned with the color film substrate. Thus the top of the main spacer is connected to the first source and the projection of the top of the auxiliary spacer on the array substrate connects the first drain with the first detection line. Upon the alignment of the array substrate with the color film substrate, the top of the main spacer 20 is connected to the first source 15, and the top of the auxiliary spacer 21 is not connected to any part, but the projection of the top of the auxiliary spacer 21 on the array substrate connects the first drain 16 with the first detection line 10.

In the touch display panel and its manufacturing method and driving method of the first embodiment of the present invention, the respective metal wirings for implementing the touch control function can be arranged on different display panels (e.g. the array substrate and/or color film substrate), therefore the number of the wirings on the array substrate can be effectively reduced, and the complexity of the manufacturing process of the array substrate can be further decreased and the aperture ratio of the pixel unit can be increased. Second embodiment FIG. 4 is the structural diagram of the touch display panel according to the second embodiment of the present invention, FIG. 5 is the top view of the color film substrate in FIG. 4, and FIG. 6 is the section view of the touch display panel along line A-A in FIG. 4.

Figure 4:
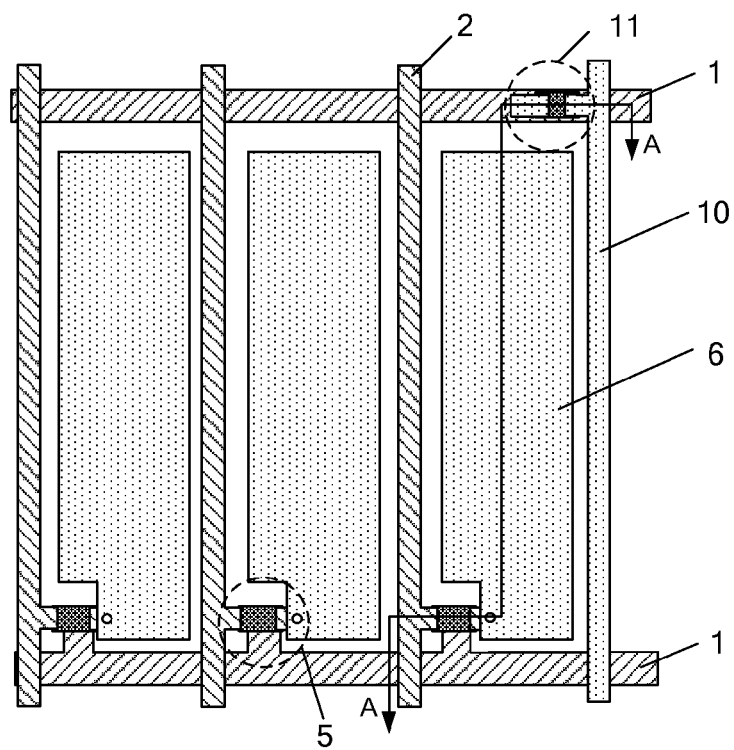
FIG. 4 is a structural diagram of the touch display panel according to a second embodiment of the present invention.
Figure 5:
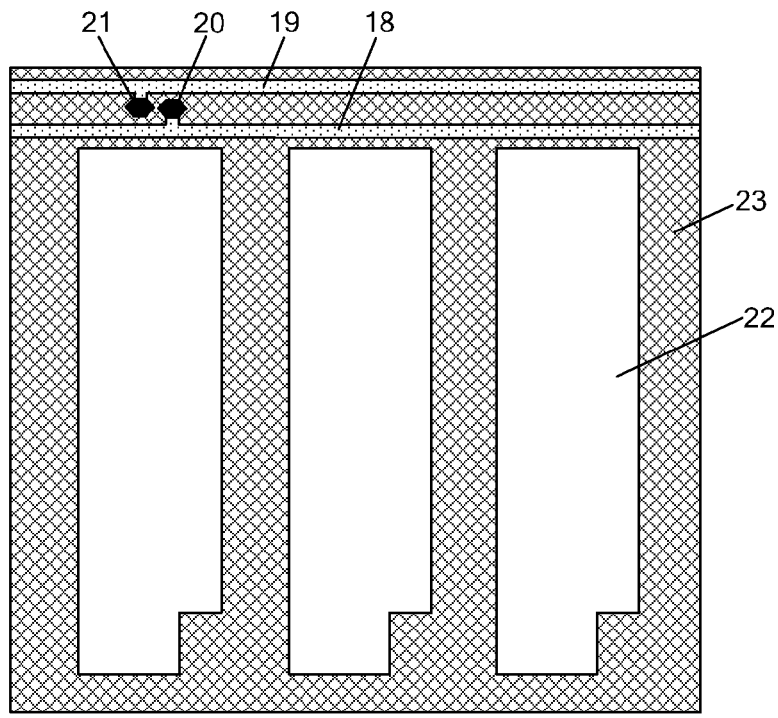
FIG. 5 is a top view of the color film substrate in FIG. 4.
Figure 6:
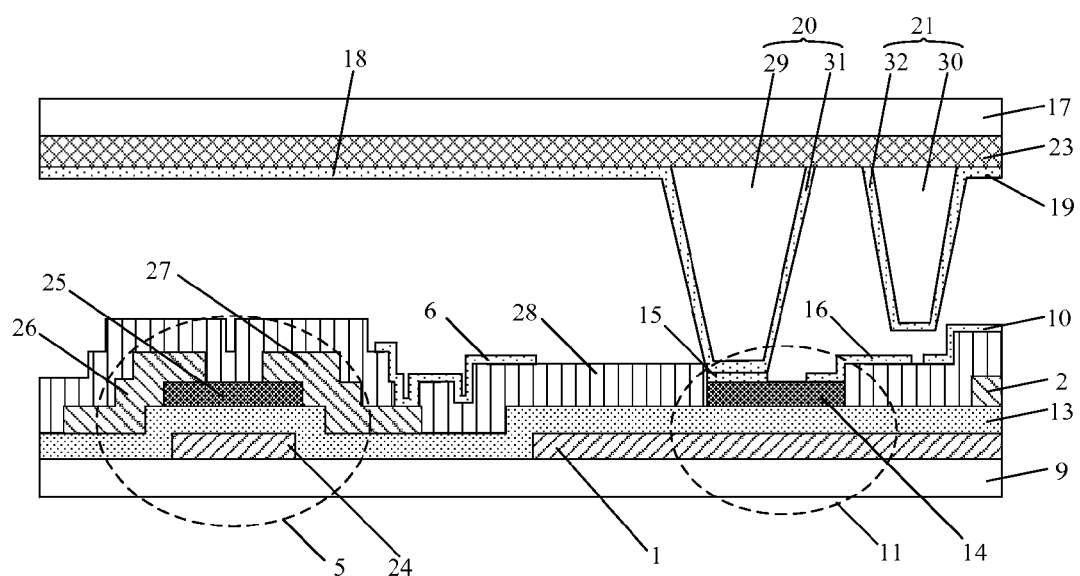
FIG. 6 is a section view of the touch display panel along line A-A in FIG. 4.

As shown in FIGS. 4-6, the touch display panel comprises the array substrate and the color film substrate. In addition to the first thin film transistor 11 and first detection line 10 in the first embodiment, the array substrate further comprises a gate line 1 and a data line 2. The gate line and the data line may define a pixel unit in which a pixel electrode 6 and a second thin film transistor 5 are formed. The second thin film transistor 5 comprises a second gate 24, a second active layer 25, a second source 26 and a second drain 27. The second drain 27 is connected to the pixel electrode 6.

In the array substrate of the touch display panel of this embodiment, there are the following relationships between the gate line, the data line, the first thin film transistor 11 and the second thin film transistor 5. The second gate 24 is formed on the first substrate 9. The second gate 24 and the gate line 1 are disposed at the same layer. The gate line is reused as the first gate. The gate insulation layer 13 is formed on the gate line 1 and the second gate 24. The first active layer 14 and the second active layer 15 are disposed at the same layer and formed on the gate insulation layer 13. The second source 26 and the second drain 27 are formed at the same layer as the data line 2 and formed on the second active layer 25. The passivation layer 28 is formed on the second source 26, the second drain 27 and the data line 2. The via hole is formed in the region corresponding to the second drain 27 in the passivation layer 28, and an opening is formed in the region corresponding to the first active layer 14 in the passivation layer 28. The first source 15, the first drain 16, the first detection line 10 and the pixel electrode 6 are disposed at the same layer and formed on the passivation layer 28. The first source 15 and the first drain 16 are connected to the second active layer 25 within the opening and spaced from each other. The first detection line 10 is located outside the opening.

It can be seen from the relationships described above that, in the manufacturing of the array substrate of the touch display panel of the embodiment of the present invention, only the mask plates corresponding to the respective components of the second thin film transistor and the pixel electrode need to be improved for the existing array substrate, such that the respective mask plates comprise the patterns of the structures of the second thin film transistor, the pixel electrode, and the first thin transistor, and thus the first thin film transistor 11 can be manufactured when manufacturing the second thin film transistor and the pixel electrode. Therefore, when manufacturing the array substrate, it is not necessary to separately design a process for the manufacturing of the first thin film transistor 11, thereby reducing the production period of the array substrate and the cost of the production line.

In the embodiment, the gate line in the touch display panel is used as the first gate 12 of the first thin film transistor 11, thus the display function and touch control function of the touch display panel can be implemented simultaneously, where the start signal is the scan signal in the gate line.

The method for driving the touch display panel as shown in FIG. 4 is also provided. The method comprises loading the scan signal into the gate line, such that both of the first and second thin film transistors are turned on, and the reference signal line is loaded with the current signal, and the data line is loaded with the display signal. In the display by the pixels, as the second thin film transistor is turned on, the display signal in the data line is transmitted to the corresponding pixel electrode through the second thin film transistor so as to implement the display function. At the same time, as the first thin film transistor 11 is also turned on, the current signal in the reference signal line 18 may be transmitted to the first drain 16 through the first thin film transistor 11. When there is a touch on the touch display panel, the auxiliary spacer 21 at the touch point will move downwards to be connected to both of the first drain 16 and the first detection line 10. The current signal in the first drain 16 is transmitted to the first detection line 10 and the second detection line 19. Then the detection unit may detect the current signal in the first detection line 10 (to determine a horizontal ordinate of the touch point) and the second detection line 19 (to determine a vertical coordinate of the touch point) to determine the position of the touch point, thereby implementing the touch control function.

In the embodiment of the present invention, the height of the main spacer 20 may be greater than that of the auxiliary spacer 21 so as to ensure that the top of the auxiliary spacer 21 would not be connected to other parts when there is no touch on the touch display panel.

In the embodiment of the present invention, the first detection line 10 may be located right above the data line. That is, the first detection line 10 may be arranged to overlap the data line, and thus the arrangement of the first detection line 10 would not affect the aperture ratio of the pixel unit.

In the color film substrate of the touch display panel of the present embodiment, the reference signal line 18 and the second detection line 19 may be parallel to the gate line, and the reference signal line 18 and the second detection line 19 may be disposed at the same layer. In the embodiment of the present invention, the reference signal line 18 and the second detection line 19 are arranged to be parallel to the gate line, thus the gate line can cover the reference signal line 18 and the second detection line 19 more easily (the reference signal line 18 and the second detection line 19 are located outside of the pixel unit). Furthermore, the arrangement of the reference signal line 18 and the second detection line 19 at the same layer may facilitate the manufacturing by means of a one-time pattering process, so as to save the production process.

In the embodiment of the present invention, the color film substrate may further comprise a color film layer 22 and a black matrix 23 formed on the second substrate 17. The common electrode is further formed on the black matrix 23, and the reference signal line 18 and the second detection line 19 are disposed at the same layer as the common electrode. In the embodiment, as the reference signal line 18 and the second detection line 19 are disposed at the same layer as the common electrode, the reference signal line 18 and the second detection line 19 can be manufactured at the same time when manufacturing the common electrode for the existing color film substrate.

In the embodiment of the present invention, the main spacer 20 may comprise a main spacer body 29 and a main spacer conductive layer 31 disposed on the outside surface of the main spacer body 29. The auxiliary spacer 21 may comprise an auxiliary spacer body 30 and an auxiliary spacer conductive layer 32 disposed on the outside surface of the auxiliary spacer body 30. The main spacer conductive layer 31 and the reference signal line 18 may be integrally formed, and the auxiliary spacer conductive layer 32 and the second detection line 19 may be integrally formed.

It should be noted that in the embodiment of the present invention, in the case that both of the main spacer body 29 and the auxiliary spacer body 30 are made of an electrically conductive material, it is not necessary to arrange the main spacer conductive layer 31 outside the main spacer body 29 and to arrange the auxiliary spacer conductive layer 32 outside the auxiliary spacer body 30.

Figure 7:
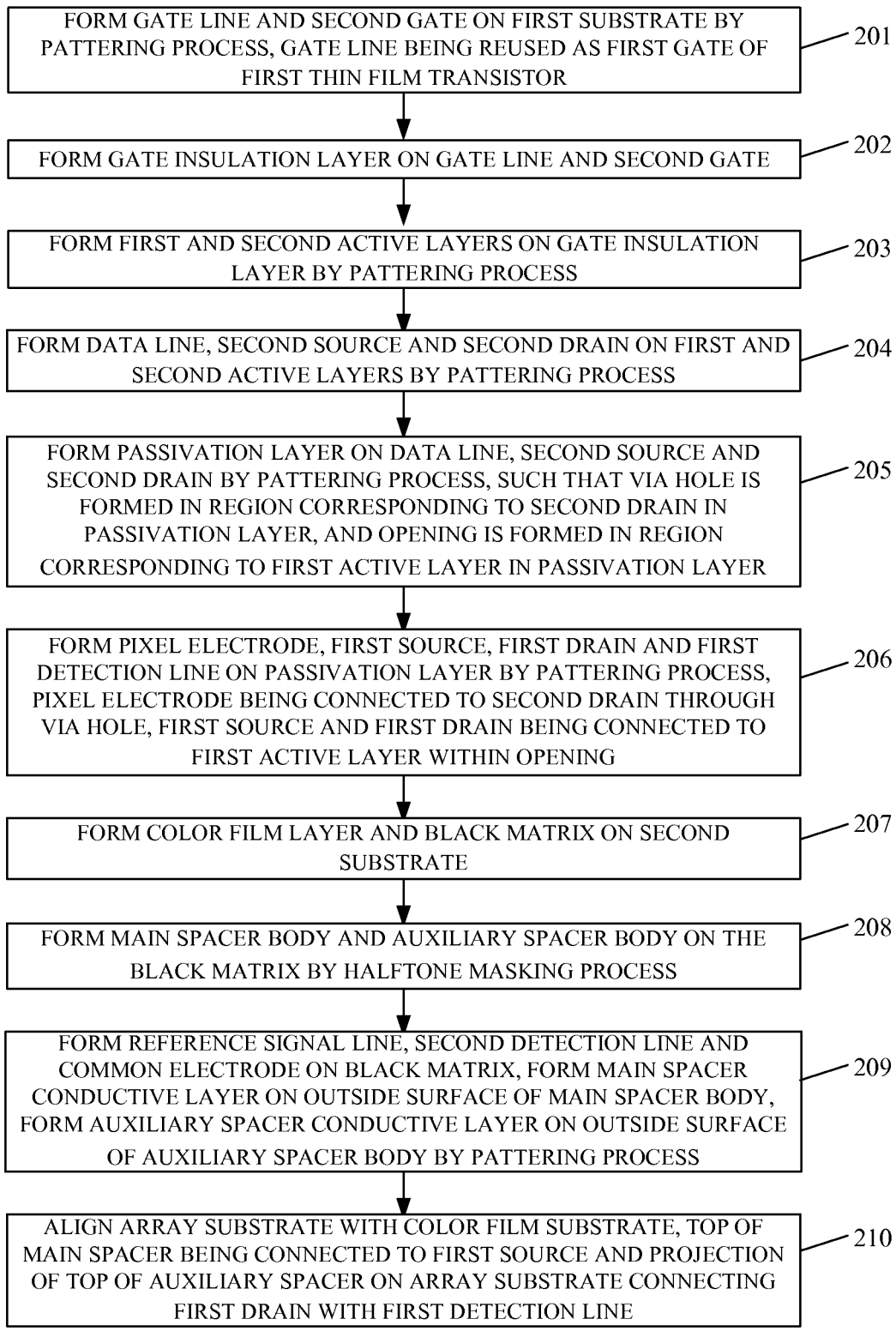
FIG. 7 is a flow chart of the method for manufacturing the touch display panel as shown in FIG. 4.

The method for manufacturing the touch display panel as shown in FIG. 6 is also provided. FIG. 7 is a flow chart of the method for manufacturing the touch display panel according to the second embodiment of the present invention, and FIGS. 8a-8i are the section views of the respective structures of the touch display panel during the manufacturing. As shown in FIG. 7 and FIGS. 8a-8i, the touch display panel comprises the array substrate and the color film substrate disposed in opposition to the array substrate. The manufacturing method may comprise the following steps 201 to 210.

In step 201, the gate line and the second gate are formed on the first substrate by means of the pattering process. The gate line can be reused as the first gate of the first thin film transistor.

Figure 8A:
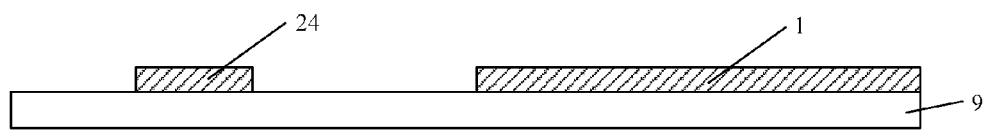
FIGS. 8*a*-8*i* are section views of the respective structures of the touch display panel during the manufacturing.

Referring to FIG. 8a, in step 201, a gate metal material film is firstly formed on the first substrate 9, and then the gate metal material film is patterned to form a pattern including the second gate 24 and the gate line 1 by means of the pattering process. The gate line is reused as the first gate electrode 12.

It should be noted that the process for forming a film used in the embodiment of the present invention may use deposition, coating, sputtering, or the like. The pattering process used in the embodiment of the present invention refers to a process including photo-resist coating, exposing, developing, etching, and photo-resist stripping.

Figure 8B:
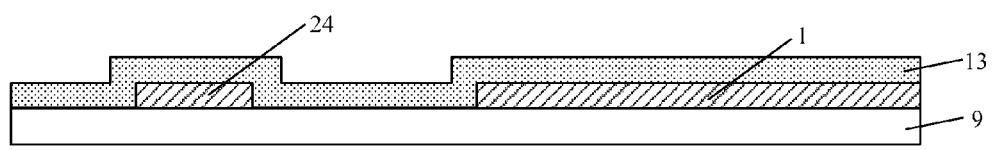

In step 202, the gate insulation layer is formed on the gate line and the second gate. Referring to FIG. 8*b*, in step 202, a layer of insulation material is formed on the gate line and the gate by means of vapor deposition technique, to form the gate insulation layer 13.

In step 203, the first active layer and the second active layer are formed on the gate insulation layer by means of the pattering process.

Figure 8C:
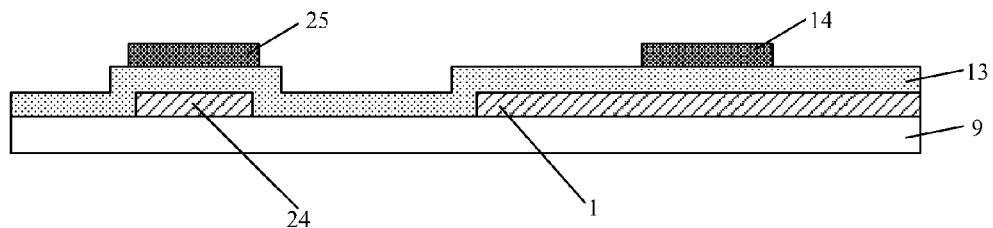

Referring to FIG. 8*c*, in step 203, a film of active layer material is formed on the insulation layer 13 firstly, and then the film is patterned to form the pattern including the first active layer 14 and the second active layer 25 by means of the pattering process. The first active layer 14 and the gate line are arranged correspondingly, and the second active layer 25 and the second gate 24 are arranged correspondingly.

In step 204, the data line, the second source and the second drain are formed on the first active layer and the second active layer by means of the pattering process.

Figure 8D:
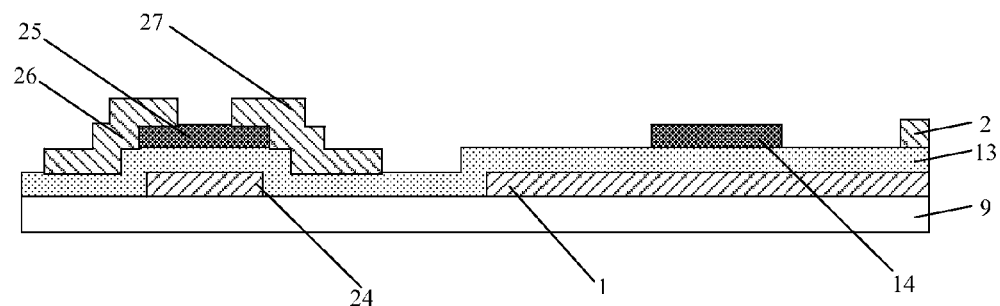

Referring to FIG. 8*d*, in step 204, a film of source drain metal material is formed on the first active layer 14 and the second active layer 25 firstly, and then the film is patterned to form the pattern including the data line, the second source 26 and the second drain 27 by means of the pattering process.

In step 205, the passivation layer is formed on the data line, the second source and the second drain by means of the pattering process, such that the via hole is formed in the region corresponding to the second drain in the passivation layer, and the opening is formed in the region corresponding to the first active layer in the passivation layer.

Figure 8E:
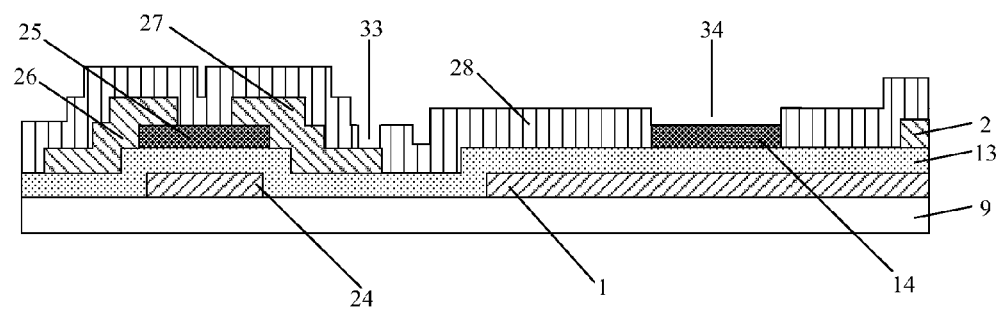

Referring to FIG. 8*e*, in step 205, a film of passivation material is formed on the data line 2, the second source 26 and the second drain 27 firstly, and then the film is patterned to form the via hole 33 in the region corresponding to the second drain 27 and form the opening 34 in the region corresponding to the first active layer 14 by means of the patterning process. The remaining film of passivation material forms the pattern of the passivation layer 28.

In step 206, the pixel electrode, the first source, the first drain and the first detection line are formed on the passivation layer by means of the pattering process. The pixel electrode is connected to the second drain through the via hole, and the first source and the first drain are connected to the first active layer within the opening.

Figure 8F:
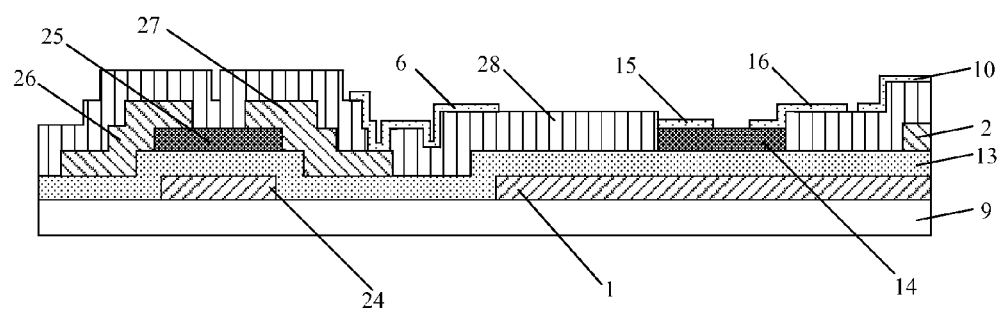

Referring to FIG. 8*f*, in step 206, a film of pixel electrode material is formed on the passivation layer 28 firstly, and then the film is patterned to form a pattern including the pixel electrode 6, the first source 15, the first drain 16 and the first detection line 10 by means of the patterning process. The pixel electrode 6 is connected to the second drain 27 through the via hole 33. The first source 15 and the first drain 16 are connected to the first active layer 14 within the opening 34 and spaced from each other. The projection of the first detection line 10 on the first substrate 9 is overlapped with the projection of the data line on the first substrate 9.

Figure 8G:

The array substrate can be manufactured through steps 201 to 206. In step 207, the color film layer and the black matrix are formed on the second substrate. Referring to FIG. 8*g*, in step 207, the pattern including the color film layer 22 and the black matrix 23 is formed on the second substrate 17 utilizing any existing manufacturing process, which is well known in the art and thus its description is omitted.

In step 208, the main spacer body and the auxiliary spacer body are formed on the black matrix by means of the halftone masking process.

It should be noted that in the embodiment of the present invention, it is described that the main spacer 20 comprises the main spacer body 29 and the main spacer conducting layer 31 and the auxiliary spacer 21 comprises the auxiliary spacer body 30 and the auxiliary spacer conducting layer 32, as an example.

Figure 8H:
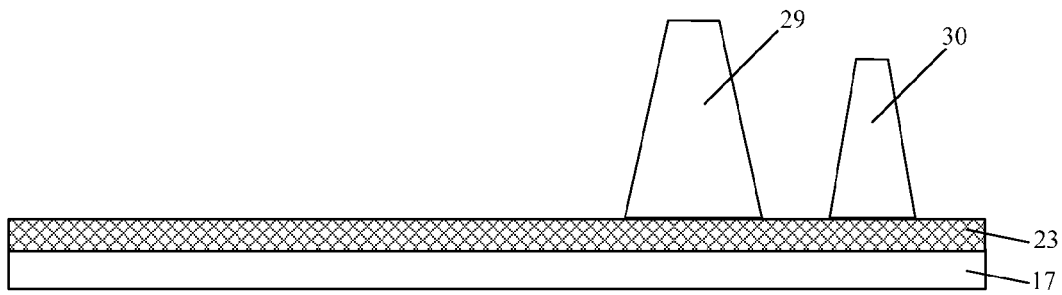

Referring to FIG. 8*h*, in step 208, the main spacer body 29 and the auxiliary spacer body 30 are formed on the black matrix 23 by means of the halftone masking process. The height of the main spacer body 29 is greater than that of the auxiliary spacer body 30. It is well known in the art to manufacture images with different heights by means of the halftone masking process, and thus its description will be omitted.

In step 209, by means of the pattering process, the reference signal line, the second detection line and the common electrode are formed on the black matrix, the main spacer conductive layer is formed on the outside surface of the main spacer body, and the auxiliary spacer conductive layer is formed on the outside surface of the auxiliary spacer body.

Figure 8I:
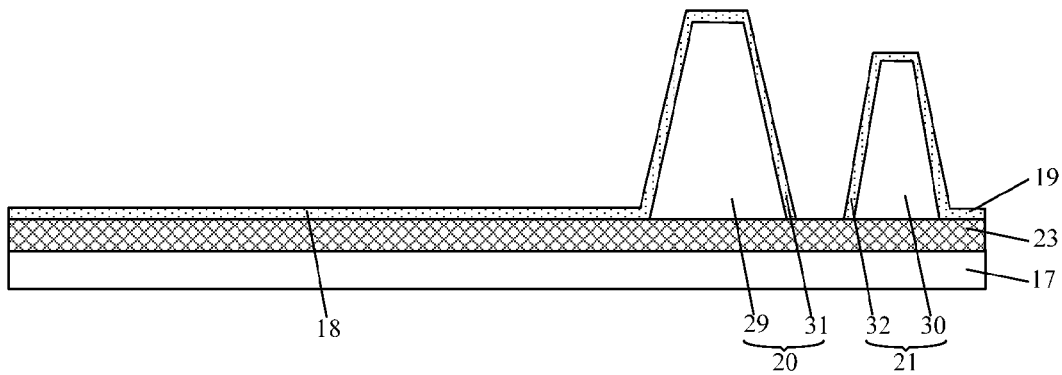

Referring to FIG. 8*i*, in step 209, a film of common electrode material is formed on the black matrix 23, the main spacer 20 and the auxiliary spacer 21 firstly, and then, by means of the patterning process, the pattern including the reference signal line 18, the second detection line 19 and the common electrode is formed on the black matrix 23, and the pattern of the main spacer conductive layer 31 is formed on the outside surface of the main spacer body 29, and the pattern of the auxiliary spacer conductive layer 32 is formed on the outside surface of the auxiliary spacer body 30. The reference signal line 18 is connected to the main spacer conductive layer 31, and the second detection line 19 is connected to the auxiliary spacer conductive layer 32.

The color film layer can be manufactured through steps 207 to 209. It should be noted that steps 207 to 209 may be performed prior to steps 201 to 206, which means that the color film layer is manufactured firstly and then the array substrate is manufactured.

In step 210, the array substrate is aligned with the color film substrate, such that the top of the main spacer is connected to the first source and the projection of the top of the auxiliary spacer on the array substrate connects the first drain with the first detection line.

Referring to FIG. 6, in step 210, upon the alignment of the array substrate with the color film substrate, the top of the main spacer 20 is connected to the first source 15, and the top of the auxiliary spacer 21 is not connected to any part, but the projection of the top of the auxiliary spacer 21 on the array substrate connects the first drain 16 with the first detection line 10.

With the touch display panel, its manufacturing method and driving method of the second embodiment of the present invention, the respective metal wirings for implementing the touch control function can be arranged on different display panels (e.g. the array substrate and/or color film substrate), therefore the number of the wirings on the array substrate can be effectively reduced, and the complexity of the manufacturing process of the array substrate can be further decreased and the aperture ratio of the pixel unit can be increased. In addition, in the manufacturing if the array substrate and color film substrate of the embodiment of the present invention, only the mask plates used in a part of the existing manufacturing process need to be changed, without changing the existing manufacturing process.

Another embodiment of the present application provides a touch display device, which comprises the touch display panel as described in the first or second embodiment.

It will be appreciated that the above embodiments are illustrative to explain the principles of the present invention. However, the present invention is not limited hereto. Without departing from the spirit and essence of the present invention, various replacement, modifications and variations may be made, which will fall into the scope of the present invention.

What is claimed is:

1. A touch display panel comprising an array substrate and a color film substrate which is disposed in opposition to the array substrate;
wherein the array substrate comprises a first thin film transistor and a first detection line formed on a first substrate, and the first thin film transistor comprises a first gate, a first active layer, a first source and a first drain;
wherein the color film substrate comprises a main spacer, an auxiliary spacer, a reference signal line and a second detection line formed on a second substrate, both of the main spacer and the auxiliary spacer are conductors, and
wherein the bottom of the main spacer is connected to the reference signal line, the top of the main spacer is connected to the first source, the bottom of the auxiliary spacer is connected to the second detection line, and a projection of the top of the auxiliary spacer on the array substrate connects the first drain with the first detection line.

2. The touch display panel according to claim 1 wherein the array substrate further comprises a gate line and a data line formed on the first substrate, wherein the gate line and the data line define a pixel unit in which a pixel electrode and a second thin film transistor are formed, and the second thin film transistor is connected to the gate line, the data line and the pixel electrode.

3. The touch display panel according to claim 2 wherein the second thin film transistor comprises a second gate, a second active layer, a second source and a second drain, wherein the second gate and the gate line are disposed at the same layer, wherein the second gate is formed on the first substrate, wherein a gate insulation layer is formed on the second gate, wherein the second active layer is formed on the gate insulation layer, wherein the second source and the second drain are formed at the same layer as the data line and are formed on the second active layer, wherein a passivation layer is formed on the second source and the second drain, wherein a via hole is formed in a region corresponding to the second drain in the passivation layer, and wherein the pixel electrode is connected to the second drain through the via hole; and
wherein the first gate is the gate line, wherein the first active layer and the second active layer are disposed at the same layer, wherein an opening is formed in a region corresponding to the first active layer in the passivation layer, wherein the first source and the first drain are disposed at the same layer as the pixel electrode and are connected to the first active layer in the opening, and wherein the first detection line and the pixel electrode are disposed at the same layer.

4. The touch display panel according to claim 3 wherein a projection of the gate line on the color film substrate covers the reference signal line and the second detection line.

5. The touch display panel according to claim 3 wherein the reference signal line and the second detection line are disposed at the same layer, and the reference signal line and the second detection line are parallel to the gate line.

6. The touch display panel according to claim 3 wherein the first detection line is located right above the data line.

7. The touch display panel according to claim 1 wherein the color film substrate further comprises a color film layer and a black matrix formed on the second substrate, wherein a common electrode is formed on the black matrix, and the reference signal line and the second detection line are disposed at the same layer as the common electrode.

8. The touch display panel according to claim 1 wherein the main spacer comprises a main spacer body and a main spacer conductive layer disposed on outside surface of the main spacer body;
wherein the auxiliary spacer comprises an auxiliary spacer body and an auxiliary spacer conductive layer disposed on outside surface of the auxiliary spacer body; and
wherein the main spacer conductive layer and the reference signal line are integrally formed, and the auxiliary spacer conductive layer and the second detection line are integrally formed.

9. The touch display panel according to claim 1 wherein the height of the main spacer is greater than that of the auxiliary spacer.

10. A touch display device comprising a touch display panel according to claim 1.

11. A method for manufacturing a touch display panel, wherein the touch display panel comprises an array substrate and a color film substrate disposed in opposition to the array substrate, and the method comprising:
manufacturing the array substrate which comprises a first thin film transistor and a first detection line formed on a first substrate, the first thin film transistor comprising a first gate, a first active layer, a first source and a first drain;
manufacturing the color film substrate which comprises a main spacer, an auxiliary spacer, a reference signal line and a second detection line formed on a second substrate, wherein both of the main spacer and the auxiliary spacer are conductors, wherein the bottom of the main spacer is connected to the reference signal line, the top of the main spacer is connected to the first source, and the bottom of the auxiliary spacer is connected to the second detection line; and
aligning the array substrate with the color film substrate, such that the top of the main spacer is connected to the first source, and a projection of the top of the auxiliary spacer on the array substrate connects the first drain with the first detection line.

12. The method according to claim 11 wherein the array substrate further comprises a gate line and a data line formed on the first substrate, wherein the gate line and the data line define a pixel unit in which a pixel electrode and a second thin film transistor are formed, and wherein the second thin film transistor comprises a second gate, a second active layer, a second source and a second drain; and
wherein the step of manufacturing the array substrate includes:

forming the gate line and the second gate on the first substrate by means of a pattering process, the gate line being reused as the first gate of the first thin film transistor;

forming a gate insulation layer on the gate lines and the second gate;

forming the first active layer and the second active layer on the gate insulation layer by means of a pattering process;

forming the data line, the second source and the second drain on the first active layer and the second active layer by means of a pattering process;

forming a passivation layer on the data line, the second source and the second drain by means of a pattering process, such that a via hole is formed in a region corresponding to the second drain in the passivation layer, and an opening is formed in a region corresponding to the first active layer in the passivation layer; and forming the pixel electrode, the first source, the first drain and the first detection line on the passivation layer by means of a pattering process, wherein the pixel electrode is connected to the second drain through the via hole, and the first source and the first drain are connected to the first active layer in the opening.

13. The method according to claim 11, wherein the color film substrate further comprises a color film layer and a black matrix formed on the second substrate, wherein a common electrode is formed on the black matrix, wherein the main spacer comprises a main spacer body and a main spacer conductive layer disposed on outside surface of the main spacer body, and wherein the auxiliary spacer comprises an auxiliary spacer body and an auxiliary spacer conductive layer disposed on outside surface of the auxiliary spacer main body; and wherein the step of manufacturing the color film substrate includes:

forming the color film layer and the black matrix on the second substrate;

forming the main spacer body and the auxiliary spacer body on the black matrix by means of a halftone masking process, wherein the height of the main spacer body is greater than that of the auxiliary spacer body; and forming the reference signal line, the second detection line and the common electrode on the black matrix by means of a pattering process, wherein the main spacer conductive layer is formed on the outside surface of the main spacer body, and the auxiliary spacer conductive layer is formed on the outside surface of the auxiliary spacer body.

14. A method for driving a touch display panel, wherein the touch display panel comprises an array substrate and a color film substrate;

wherein the array substrate comprises a first thin film transistor and a first detection line formed on a first substrate, wherein the first thin film transistor comprises a first gate, a first active layer, a first source and a first drain; and wherein the color film substrate comprises a main spacer, an auxiliary spacer, a reference signal line and a second detection line formed on a second substrate, wherein both of the main spacer and the auxiliary spacer are conductors, wherein the bottom of the main spacer is connected to the reference signal line which is loaded with a current signal, the top of the main spacer is connected to the first source, the bottom of the auxiliary spacer is connected to the second detection line, and a projection of the top of the auxiliary spacer on the array substrate connects the first drain with the first detection line; and wherein the method comprises:

loading a start signal into the first gate, such that the first thin film transistor is turned on;

in response to a touch on the touch display panel, causing the auxiliary spacer at a point of the touch to move downwards to be connected to the first drain and the first detection line, such that the current signal in the reference signal line is transmitted to the first detection line and the second detection line through the first thin film transistor and the auxiliary spacer; and detecting, by a detection unit, the current signal in the first detection line and the second detection line to determine a position of the point to implement touch control function.

15. The method according to claim 14 wherein the array substrate further comprises a gate line and a data line formed on the first substrate, wherein the gate line and the data line define a pixel unit in which a pixel electrode and a second thin film transistor are formed, wherein the second thin film transistor comprises a second gate, a second active layer, a second source and a second drain, wherein the first gate is the gate line, and the start signal is a scan signal loaded in the gate line; and wherein the method further comprises: at the same time of performing the step for implementing the touch control function, loading the scan signal into the gate line, such that the second thin film transistor is turned on, and a display signal in the data line is transmitted to the corresponding pixel electrode through the second thin film transistor.

* * * * *